United States Patent [19]

Trocciola

[11] 3,905,832

[45] Sept. 16, 1975

[54] NOVEL FUEL CELL STRUCTURE

[75] Inventor: John C. Trocciola, Glastonbury, Conn.

[73] Assignee: United Aircraft Corporation, East Hartford, Conn.

[22] Filed: Jan. 15, 1974

[21] Appl. No.: 433,446

[52] U.S. Cl. ............................................. 136/86 R
[51] Int. Cl. .......................................... H01m 27/00
[58] Field of Search ....................... 136/86 R, 86 D

[56] References Cited
UNITED STATES PATENTS

| | | | |
|---|---|---|---|
| 3,442,712 | 5/1969 | Roberts............................ | 136/86 R |
| 3,748,179 | 7/1973 | Bushnell........................... | 136/86 R |
| 3,779,811 | 12/1973 | Bushnell........................... | 136/86 R |

*Primary Examiner*—John H. Mack
*Assistant Examiner*—H. A. Feeley
*Attorney, Agent, or Firm*—A. W. Breiner

[57] ABSTRACT

A compact electrochemical cell comprising a pair of opposed electrodes; an electrolyte matrix containing an aqueous, ion-conductive electrolyte between the opposed electrodes; and an electrolyte reservoir positioned behind and partially defined by at least one of said electrodes. The electrode partly defining the reservoir has a continuous hydrophobic surface and select hydrophilic areas substantially uniformly distributed within the boundaries of the electrode surface. The electrolyte volume of the cell is controlled by electrolyte movement between the electrolyte matrix of the cell and the reservoir through the select hydrophilic areas of the electrode, thereby stabilizing the electrochemical performance of the cell.

9 Claims, 3 Drawing Figures

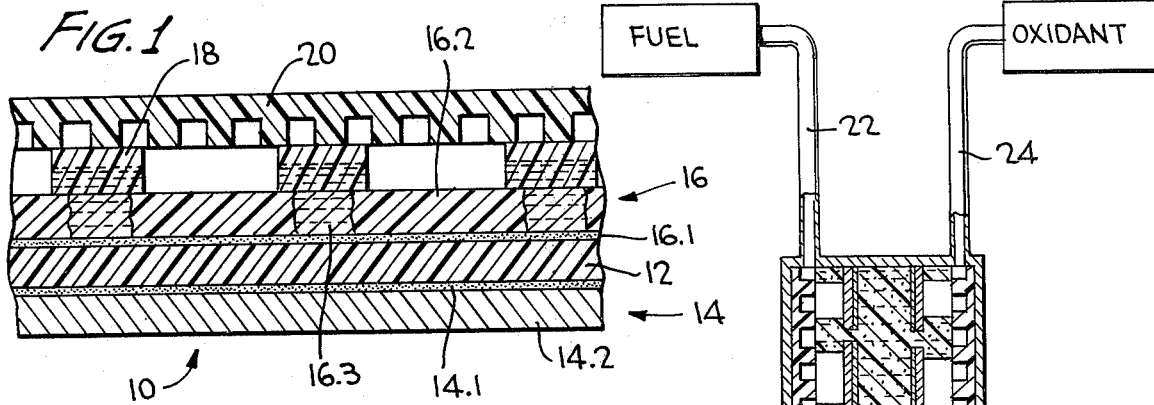
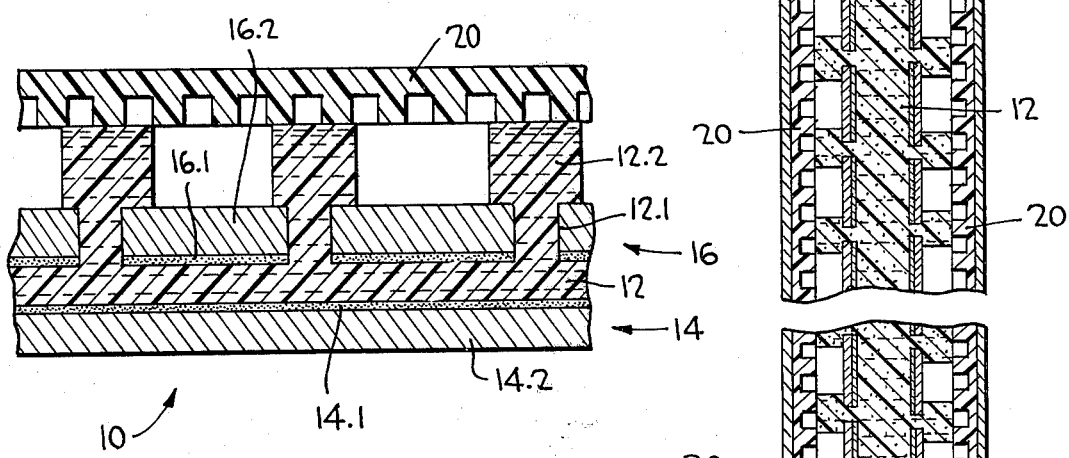
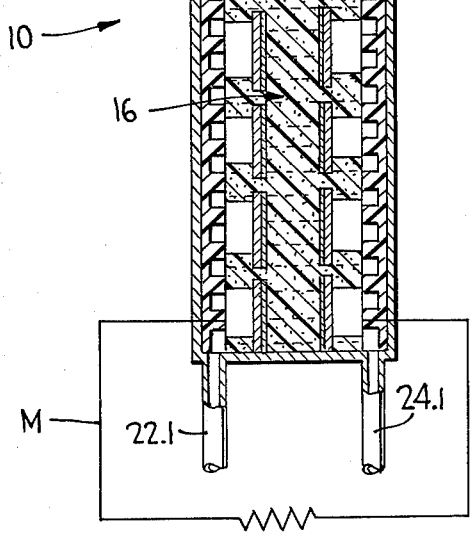

NOVEL FUEL CELL STRUCTURE

FIELD OF INVENTION AND BACKGROUND

This invention relates to electrochemical cells and more particularly, to an improvement in an electrochemical cell utilizing an electrolyte contained in or trapped in a matrix between the electrodes of a cell with the volume of the electrolyte in the matrix being controlled, thereby stabilizing cell performance. For convenience hereinafter, the cell will be described with reference to a fuel cell for the direct generation of electricity using two nonconsumable electrodes. As will be apparent, however, similar considerations governing the use of the invention in such cells will apply to other electrochemical devices such as electrolyzers, enabling the use of the invention in such devices.

A fuel cell, as the term is employed herein, designates an electrochemical cell for the direct production of electrical energy from a fuel and oxidant. With such cells, chemical energy is converted directly to electrical energy, precluding the inefficiencies of the Carnot heat cycle. A fuel cell in its most simplified design comprises a housing, an oxidant electrode, a fuel electrode, and an electrolyte. In operation, the fuel and oxidant contact a surface of their respective electrode where a process of adsorption and de-adsorption occurs, leaving the electrodes electrically charged, with the second surface of the electrode being in contact with the electrolyte. Depending upon the nature of the electrolyte, ions are transferred through the electrolyte from the anode to the cathode, or from the cathode to the anode. Electrical current is withdrawn from the cell and passed through a suitable load where work is accomplished.

Although the electrolyte can be a solid, a molten paste, a free-flowing liquid, or a liquid trapped in a matrix, as a result of design considerations including compactness and the desire to have a limited number of controls and/or ancillary equipment, cells utilizing a liquid electrolyte trapped in a hydrophilic matrix are preferred for many applications. A problem of such cells, however, is the change of electrolyte volume within the matrix as a result of water being formed during the operation of the cell by the interaction of the fuel and oxidant, or as a result of electrolyte loss through excessive heat-up of the cell during use, or use of dry reactants which absorb and consume the electrolyte during operation of the cell. In instances where the electrolyte is increased, the excess electrolyte is carried by capillary action or the force created by internal vapor pressures within the cell into the electrodes, with resultant flooding of the electrodes. In instances where the volume of the electrolyte is decreased, dry-out will occur at the electrolyte matrix/electrode interface. such flooding and/or dry-out adversely affect the electrochemical performance of the cell.

To compensate for the change in electrolyte volume in a trapped electrolyte cell, thick metal or carbon sinters have been utilized as an electrode substrate to compensate for the increase in volume of the electrolyte during the operation of the cell. More recently, cells have been designed which have a reservoir behind one electrode of the fuel cell, with this reservoir being in electrolyte communication with the electrolyte matrix through projections or pins, or the like, in a special separator plate. In such embodiments, however, it has been necessary to utilize specially constructed reservoir plates which have increased the weight as well as the cost of the cell.

SUMMARY OF THE INVENTION

In accordance with the present invention, a matrix-type fuel cell is provided having an electrolyte reservoir in communication with the electrolyte matrix without need of bulky or expensive ancillary components. Specifically, a matrix-type fuel cell is constructed which incorporates a reservoir behind at least one electrode having a predetermined, continuous hydrophobic surface area. The electrolyte matrix is in electrolyte communication with the reservoir, and electrolyte is free to move back and forth between the reservoir and cell electrolyte matrix, through non-hydrophobic areas substantially uniformly spaced in the continuous hydrophobic surface of the electrode as the electrolyte volume changes. By having the reservoir contain less than its capacity volume, the electrolyte volume of the electrolyte matrix will always be maintained constant, avoiding fluctuations in the cell performance as a result of electrolyte volume change. Thus, as the electrolyte within the cell increases as a result of water formation during the cell reactions, the volume of electrolyte in the reservoir will increase; or if the electrolyte within the electrolyte cell matrix decreases as a result of excessive heat or excessive reactant flow, electrolyte will flow from the reservoir to the cell matrix increasing the electrolyte in the matrix. At all times the electrolyte within the cell matrix will remain constant, the reservoir feeding electrolyte to the electrolyte matrix on demand, or withdrawing or removing electrolyte from the matrix as it is formed.

The fabrication of the reservoir-electrolyte arrangement for the cell can take various forms. In one preferred embodiment, a hydrophilic electrode is blocked off or masked with a select pattern in order that the area under the pattern is not exposed. The electrode is made hydrophobic in the exposed areas by applying an aqueous suspension of a hydrophobic polymer thereto. After applying the hydrophobic polymer, the masking is removed and a layer or buildup of hydrophilic material which will function as an electrolyte reservoir is applied to the unexposed, non-hydrophobic select areas. This fabrication can be accomplished with silk-screening or paper-making techniques. When the above-formed electrode structure is brought in contact with an electrolyte matrix in a fuel cell construction, the electrolyte in the electrolyte matrix is free to move from the reservoir to the matrix, or vice versa, through the hydrophilic portion of the electrode. In another embodiment, a hydrophobic electrode is fabricated and holes of a select pattern cut into the electrode. Thereafter, these holes are filled with a hydrophilic matrix-like material which extends beyond the surface of the holes above the hydrophobic electrode to provide a matrix reservoir. When this structure is employed in a fuel cell, electrolyte from the electrolyte matrix flows back and forth between the electrolyte matrix and the reservoir matrix material by capillary action. In still another embodiment, holes are cut in the hydrophobic electrode in a suitable pattern, but the holes are not filled with the hydrophilic matrix material. A hydrophilic matrix-like layer is positioned above the hydrophobic electrode so that the hydrophilic matrix material corresponds with the holes. In this embodiment, electrolyte flows between the electrolyte reservoir and electrolyte matrix through the holes in the electrode. As will be apparent, various other modifications can be made which will provide the essential requirements in accordance with this invention using silk-screening, papermaking, or the like, techniques.

THE DRAWING AND SPECIFIC EMBODIMENTS

In order to more specifically describe the present invention, reference is made to the accompanying drawing wherein -

FIG. 1 is a broken-away, transverse sectional view showing an embodiment according to the present invention;

FIG. 2 is a broken-away, sectional view through a second embodiment according to the present invention; and FIG. 3 is a transverse sectional view through a single fuel cell constructed in accordance with the design illustrated in FIG. 2.

Referring to the drawing, the fuel cell 10 comprises an anode 16 and cathode 14 separated by electrolyte matrix 12. In the embodiment of FIG. 1, the anode 16 comprises catalytic layer 16.1 and a hydrophobic substrate layer 16.2. Cathode 14 comprises hydrophobic layer 14.2 and catalyst layer 14.1. The hydrophobic layer 16.2 of the anode has select areas 16.3 which are not hydrophobic, but are hydrophilic due to the construction of the electrode, using the technique noted above. Behind anode 16 and matched with the hydrophilic areas, a matrix material 18 is positioned which functions as an electrolyte reservoir. A separator 20 is positioned behind the reservoir to hold the reservoir material in operable position and to help retain the components of the cells in operable association. In accordance with this embodiment, electrolyte from matrix 12 is free to communicate with reservoir 18 through hydrophilic area 16.3 of anode 16; at all times maintaining a uniform electrolyte volume in matrix 12.

In the embodiment of FIG. 2, the hydrophobic anode 16 has holes 12.1 which are filled with electrolyte matrix material 12 and this material extends behind the electrode in select areas to provide reservoir means 12.2. As in FIG. 1, electrolyte in the matrix 12 is free to communicate with electrolyte in reservoir 12.2 through the select areas 12.1 in hydrophobic electrode 16.

In FIG. 3, the embodiment of FIG. 2 is arranged in a fuel cell configuration. However, in the fuel cell of FIG. 3, both the anode and cathode are constructed so that the electrolyte matrix is in communication with an electrolyte reservoir through select areas of the electrode. In operation, electrolyte matrix 12 is saturated with a 30 percent aqueous potassium hydroxide electrolyte, the volume being sufficient to only partially fill reservoir matrix 12.2. A reactant gas, in this instance hydrogen, is fed from a storage container to anode 16 through the gas inlet 22, with excess gas being removed through outlet 22.1. An oxidant, in this instance oxygen, is fed from a storage container to cathode 14 through inlet 24, with excess air and impurities being vented through exit 24.1. Electric current is withdrawn through circuit M. Although in the embodiment shown, the cell employs separator 20 as well as housing 30, the separator 20 can be, if desired, identical to or integral with the housing. In other words, there need not be a separate element. The cell, when operated at a constant current drain, will provide a substantially constant cell output. There is little fluctuation in the current characteristics of the cell since the total volume tolerance function is separated from the electrochemical function because of the use of the electrolyte reservoir.

In the preferred embodiments, the electrodes are lightweight, screen-type electrodes comprising the hydrophobic layer in contact with a catalytic layer which is a uniform admixture of catalytic metal such as platinum, with a hydrophobic polymer such as polytetrafluoroethylene. The ratio of platinum to polytetrafluoroethylene on a volume basis is 7 : 3, with the platinum loading on the electrode being approximately 10 mg/cm$^2$. The electrodes are approximately 8 mils in thickness. The electrolyte matrix in a preferred embodiment is pressed asbestos and is approximately 20 mils thick. The reservoir matrix is of lesser thickness than the electrolyte matrix and is approximately 12 mils thick.

Although the present invention has been described with reference to a potassium hydroxide electrolyte, other electrolytes can be employed including aqueous solutions of other alkali hydroxides, the alkaline earth hydroxides and carbonates; as well as strong acid electrolytes such as hydrochloric acid, sulfuric acid, and phosphoric acid. Furthermore, commonly employed reactants, in addition to hydrogen and oxygen as described, can be utilized in the cells of the present invention. As will be apparent, the concept of the present invention can be employed in any of the prior art cells which utilize an electrolyte matrix and where electrolyte volume control within a matrix-type electrolyte is essential. The catalyst which can be utilized in the cells of the present invention can be any of the catalysts commonly employed in fuel cell electrodes, it only being essential that they be electrochemically reactive with the fuel or oxidant employed. The Group VIII metals of the Mendelyeev's Periodic Table are preferred, particularly the metals platinum, palladium, rhodium, and admixtures thereof. The polymer utilized in the electrodes can also be those commonly employed in fabricating lightweight electrodes including, in addition to polytetrafluoroethylene, polyvinylidenefluoride, polychlorotrifluoroethylene, polyvinylfluoride, co-polymers thereof, and the like. Furthermore, although the present invention is described and illustrated in the drawing with reference to a single cell, it should be apparent that in preferred constructions a plurality of cells will be stacked together. These modifications being within the ability of one skilled in the art are to be covered herein with the invention only being limited in accordance with the appended claims.

It is claimed:

1. A fuel cell having a pair of opposed electrodes, an electrolyte matrix positioned between said pair of electrodes, at least one of said pair of electrodes having a hydrophobic surface having a predetermined surface area, a reactant chamber adjacent said one of said pair of electrodes and in fluid contact with said hydrophobic surface, and an electrolyte reservoir positioned behind said one electrode to extend into and partially occupy the space of said chamber, said reservoir and electrolyte matrix containing an aqueous electrolyte and being in electrolyte communication with each other through said one electrode at select areas only substantially uniformly distributed throughout said hydrophobic predetermined surface area, said select areas being non-hydrophobic and constituting a minor area in relation to said hydrophobic predetermined surface area of said one electrode, said electrolyte filling less than the entire volume of said reservoir whereby the electrolyte volume of said electrolyte matrix is maintained constant.

2. The fuel cell of claim 1 wherein said electrolyte reservoir comprises an electrolyte-permeable matrix, with said matrix extending through said select non-hydrophobic areas contacting said electrolyte matrix.

3. The fuel cell of claim 1 wherein said one electrode comprises a hydrophilic structure made hydrophobic by impregnation thereof with a hydrophobic material.

4. The fuel cell of claim 3 wherein the hydrophobic material is polytetrafluoroethylene and the hydrophilic structure is carbon paper.

5. The electrode of claim 4 wherein the select non-hydrophobic areas are continuous with said hydrophobic surface area and being formed by not being treated with the hydrophobic material.

6. The electrode of claim 1 wherein the select non-hydrophobic areas are holes.

7. The method of fabricating a fuel cell element comprising masking a hydrophilic substrate in select areas; rendering said hydrophilic substrate hydrophobic in the non-masked areas by applying a hydrophobic polymer thereto; removing said masking and applying a hydrophilic matrix material to said substrate to selectively correspond to the masked areas; applying a catalyst layer to said substrate at the surface opposite to that of said matrix material, and disposing said element in a fuel cell comprising an electrolyte matrix so that said catalyst layer of said element is in contact with said electrolyte matrix, and said electrolyte matrix is in communication with said hydrophilic material of said element through the non-masked areas of said substrate.

8. The method of claim 7 wherein the hydrophilic material is carbon paper.

9. The method of fabricating a fuel cell element comprising forming a lightweight electrode comprising a hydrophobic substrate and a catalyst layer at one surface of said substrate whereby said hydrophobic substrate has holes therein in a select pattern; applying a hydrophilic material at the surface of said substrate opposite to that of said catalyst layer, said hydrophilic material extending through said holes in said select pattern and building up in the area adjacent said holes, and disposing said element in a fuel cell comprising an electrolyte matrix so that said catalyst layer of said element is in contact with said electrolyte matrix and said electrolyte matrix is in contact with said hydrophilic material of said element through said holes in said electrode.

* * * * *